(12) United States Patent
Shoens

(10) Patent No.: US 8,600,939 B2
(45) Date of Patent: Dec. 3, 2013

(54) WRITABLE SNAPSHOTS

(75) Inventor: Kurt Alan Shoens, Los Altos, CA (US)

(73) Assignee: Oracle International Corporation, Redwood City, CO (US)

( * ) Notice: Subject to any disclaimer, the term of this patent is extended or adjusted under 35 U.S.C. 154(b) by 78 days.

(21) Appl. No.: 13/280,141

(22) Filed: Oct. 24, 2011

(65) Prior Publication Data

US 2013/0103644 A1 Apr. 25, 2013

(51) Int. Cl.
*G06F 17/30* (2006.01)
(52) U.S. Cl.
USPC .......................................... 707/639; 707/649
(58) Field of Classification Search
USPC ................................................ 707/639, 649
See application file for complete search history.

(56) References Cited

U.S. PATENT DOCUMENTS

| | | | |
|---|---|---|---|
| 7,373,366 B1 * | 5/2008 | Chatterjee et al. ..................... 1/1 |
| 2003/0229656 A1 * | 12/2003 | Hitz et al. ..................... 707/205 |
| 2005/0021565 A1 * | 1/2005 | Kapoor et al. ................. 707/200 |
| 2005/0065986 A1 * | 3/2005 | Bixby et al. ................... 707/204 |
| 2008/0183973 A1 * | 7/2008 | Aguilera et al. ............... 711/147 |

* cited by examiner

*Primary Examiner* — Ajay Bhatia
*Assistant Examiner* — Grace Park
(74) *Attorney, Agent, or Firm* — Marsh Fischmann & Breyfogle LLP; Daniel J. Sherwinter

(57) ABSTRACT

Embodiments of the invention include systems and methods for providing writable snapshot functionality for file systems. Pointer-based snapshots can be taken of an active version of the file system resulting in either (1) a read-only snapshot image and a new active version of the file system resulting from a read-only snapshot operation; or (2) a read-only snapshot image and two new active versions of the file system resulting from a writable snapshot operation. The two active file systems generated from writable snapshot operations are each independently and concurrently writable. Various techniques are also presented for handling multiple, concurrently active file systems. For example, novel techniques are described for allowing snapshot restore, compaction, and other functionality to operate in an environment having multiple read-only and writable versions of the file system.

17 Claims, 12 Drawing Sheets

WRITABLE SNAPSHOTS

BACKGROUND

Embodiments relate generally to data storage environments, and, more particularly, to writable snapshots of file systems in data storage systems.

A file system is a collection of files and directories plus operations on them. To keep track of files, file systems have directories. A directory entry provides the information needed to find the blocks associated with a given file (e.g., or, typically, the directory entry includes an i-number that refers to an i-node, and the i-node includes information needed to find the blocks). Many file systems today are organized in a general hierarchy (e.g., a tree of directories) because it gives users the ability to organize their files by creating subdirectories. Each file may be specified by giving the absolute path name from the root directory to the file. Every file system contains file attributes such as each file owner and creation time and must be stored somewhere such as in a directory entry.

A snapshot of a file system will capture the content (e.g., files and directories) at an instant in time. A snapshot typically results in two data images: (1) the snapshot data (e.g., pointers, indices, metadata, etc. to record the contents of the file system at that moment in time); and (2) the active data that an application can read and write as soon as the snapshot is created (i.e., the active file system). Snapshots can be taken periodically, hourly, daily, weekly, on user demand, or at any other useful time or increment. They are useful for a variety of applications including recovery of earlier versions of a file following an unintended deletion or modification, backup, data mining, or testing of software.

Providing high data availability often involves frequent snapshots that consume resources, such as memory, internal memory bandwidth, storage device capacity, and storage device bandwidth. A number of techniques exist for managing the allocation of space in the storage devices, keeping track of the blocks of a given file, and making snapshots of file systems work efficiently and reliably. However, to date, the snapshots and the techniques associated with them allow a user only to capture a "frozen" version of the file system.

Typical snapshots are read-only versions of the file system as it existed at the moment of the snapshot's creation. While these snapshots can be extremely useful for file system recovery and other functions, they are still limited. Operations that need to be able to affect the data cannot operate on a read-only snapshot. For example, it may be desirable to effectively maintain multiple "active" (i.e., writable) versions of the file system for use in supporting maintenance, testing, development, and other functions.

BRIEF SUMMARY

Among other things, systems and methods are described for providing writable snapshot functionality to support the creation and concurrent handling of multiple active file system versions. Embodiments operate in a file system stored in block storage across a virtualized storage system. Pointer-based snapshots can be taken of an active version of the file system resulting in either (1) a read-only snapshot image and a new active version of the file system resulting from a read-only snapshot operation; or (2) a read-only snapshot image and two new active versions of the file system resulting from a writable snapshot operation. The two active file systems generated from writable snapshot operations are each independently and concurrently writable. Various techniques are also presented for handling multiple, concurrently active file systems. For example, novel techniques are described for allowing snapshot restore, compaction, and other functionality to operate in an environment having multiple read-only and writable versions of the file system.

According to one set of embodiments, a method is provided for taking a writable snapshot of an active file system. The method includes: converting a first version of a file system from an active, writable version of the file system to a read-only, pointer-based snapshot of the file system; and generating second and third versions of the file system, each being an active, independently and concurrently writable version of the file system. According to some such embodiments, the first version of the file system comprises a set of pointers to blocks of a storage system including a root block. Converting the first version of the file system may include locating a first index table entry corresponding to the first version of the file system, first index table entry indicating a root block pointer to the root block and indicating a writable state, and modifying the first index table entry to indicate a read-only state. Further, generating the second and third versions of the file system may include locating second and third index table entries, both being available for assignment to a new version of the file system, modifying each of the second and third index table entries to indicate a writable state, and modifying each of the second and third index table entries to indicate a root block pointer to the root block of the first version of the file system. In certain such embodiments, each block of the storage system is associated with a space map block entry (b, e), wherein "b" represents an earliest version of the file system that points to the block, and "e" represents a latest version of the file system that points to the block.

BRIEF DESCRIPTION OF THE DRAWINGS

The present disclosure is described in conjunction with the appended figures.

Figure 1:
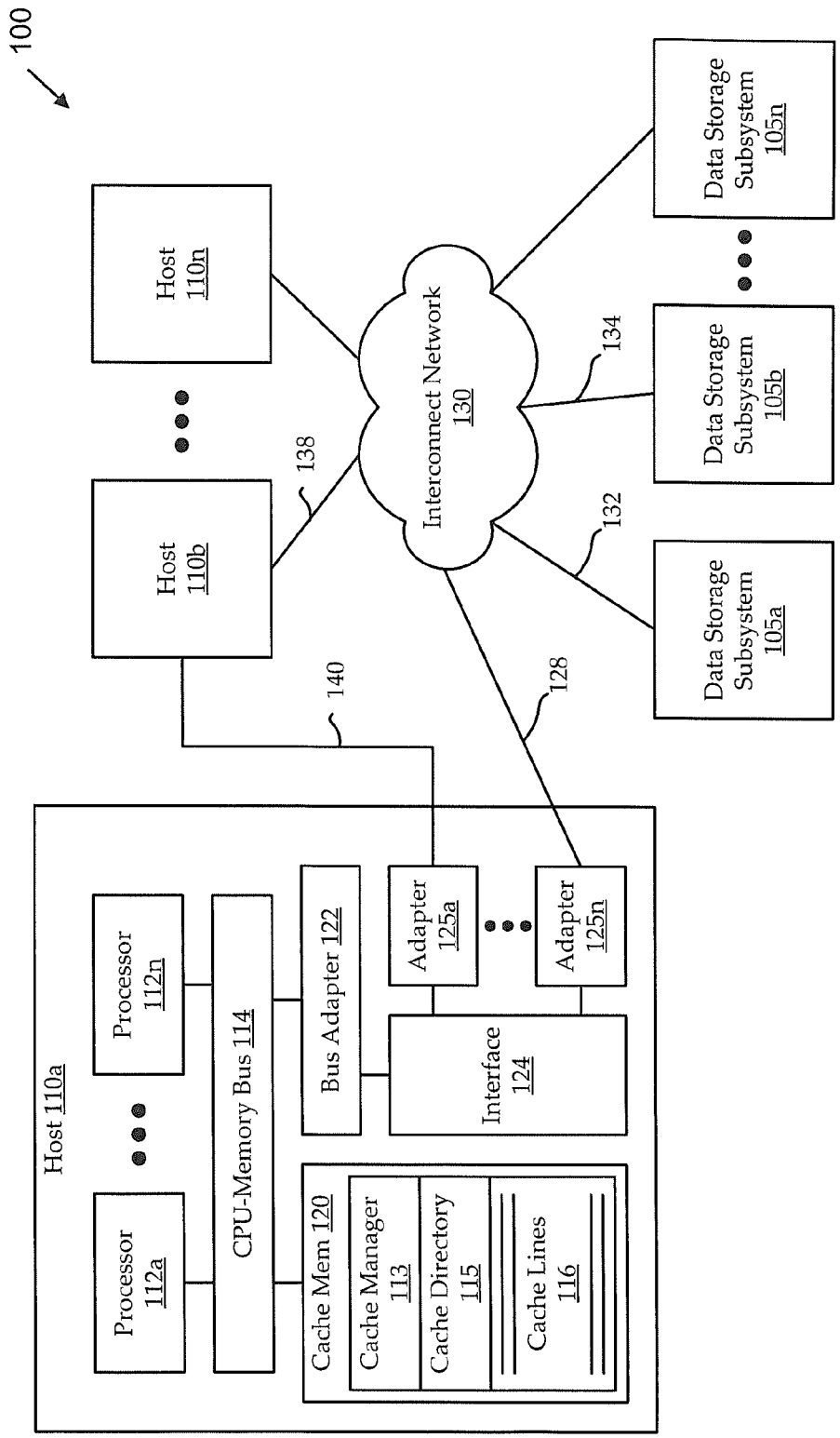
FIG. 1 shows a block diagram of an illustrative data storage system, including a number of hosts coupled to one or more data storage subsystems.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Users of large file systems often desire to perform operations outside the normal production use of the file system. For example, in addition to simply reading and writing files of a single active file system, users may desire to backup some or all of the file system, recover a previous version of the file system, preserve a version of the file system at some moment in time, etc. These and other functions can be supported by taking a snapshot of the file system, which captures the content of the active file system at an instant in time.

As used herein, "snapshots" refer generally to pointer-based snapshots. Rather than copying some or all of the file system, which would be very resource intensive, the snapshot generates a snapshot image that points to blocks of the file system where data of the file system is already stored. When active file system data is changed, a check is made to determine whether the block is in use (e.g., being pointed to) by any snapshot images. If so, the block is copied to a new block and changed in the new location so as to preserve the original block as it was when the snapshot images that refer to it were generated. It will be appreciated that various techniques are needed to ensure that the active file system and all snapshot images point to the appropriate versions of blocks.

Accordingly, taking the snapshot typically results in both (1) snapshot image data (e.g., pointers, indices, metadata, etc. to record the contents of the file system at that moment in time) and (2) active file system data (e.g., the continuing version of the file system that an application can read and write as soon as the snapshot is created). As used herein, read-only versions of the file system generated by taking read-only snapshots are referred to as "R" followed by an index number, and active (writable) versions of the file system are referred to as "W" followed by an index number. For example, when a new file system is created for the first time, it may be referred to as "W1". If a snapshot of the active file system ("W1") is taken, the operation may result in a new, read-only version of the file system ("R1") and a new, active version of the file system ("W2"). Metadata is maintained to ensure that any changes made to the file system after the snapshot is taken do not impact the blocks being referred to by the snapshot (e.g., unless the snapshot is later removed, thereby releasing those blocks).

A number of techniques exist for managing the allocation of space in the storage devices, keeping track of the blocks of a given file, and making snapshots and their respective snapshot images of active file systems work efficiently and reliably. Some of these techniques are described in U.S. Pat. No. 6,959,313, filed Jul. 8, 2003, entitled "SNAPSHOTS OF FILE SYSTEMS IN DATA STORAGE SYSTEMS"; Ser. No. 11/147,739 filed Jun. 7, 2005, issued as U.S. Pat. No. 7,257,606, entitled "METHODS OF SNAPSHOT AND BLOCK MANAGEMENT IN DATA STORAGE SYSTEMS"; Ser. No. 11/407,491, filed Apr. 19, 2006, issued as U.S. Pat. No. 7,379,954, entitled "MANAGEMENT OF FILE SYSTEM SNAPSHOTS"; Ser. No. 11/879,230, filed Jul. 16, 2007, issued as U.S. Pat. No. 7,653,669, entitled "SNAPSHOTS OF FILE SYSTEMS IN DATA STORAGE SYSTEMS"; Ser. No. 12/154,494, filed May 23, 2008, issued as U.S. Pat. No. 7,756,844, entitled "METHODS OF DETERMINING AND SEARCHING FOR MODIFIED BLOCKS IN A FILE SYSTEM"; and Ser. No. 12/586,682, filed Sep. 25, 2009, issued as U.S. Pat. No. 7,836,029, entitled "SYSTEMS AND METHODS OF SEARCHING FOR AND DETERMINING MODIFIED BLOCKS IN A FILE SYSTEM" all of which are incorporated by reference for all purposes.

Traditional snapshots generate read-only versions of the file system as it existed at the moment of the snapshot's creation. While these snapshot images can be extremely useful for file system recovery and other functions, they are limited. Operations that need to be able to affect (e.g., write to) the data cannot operate on a read-only snapshot image. For example, in addition to a "production" file system environment, it may be desirable to maintain one or more additional versions of the file system that still act like fully "active" file systems. These additional active (i.e., writable) file systems can then be used for any development, maintenance, or other functions that involve writing to the file system contents (e.g., writing to data blocks).

Embodiments are described herein for providing writable snapshot functionality to support the creation and concurrent handling of multiple active file system versions. For example, a snapshot taken of an active file system "W1" may result in a new, read-only version of the file system ("R1"), and two new, independent, and active version of the file system ("W2" and "W3"). As changes are made to the multiple active file systems, novel techniques are used to preserve versioning and other features, so that each active version of the file system can continue to point to its respective versions of the data and snapshot-related functions (e.g., restore, provisioning, replication, and backup) can continue to be supported.

For the sake of clarity, except where otherwise indicated, the term "active file system" is used herein to describe a writable image of the file system. The term "snapshot image" is used herein to describe a pointer-based, read-only image taken of an active file system at a particular time. The term "snapshot" or "snapshot operation" is used herein to describe an operation by which a snapshot image is taken of an active file system at a particular time. As described above, a read-only snapshot (i.e., a traditional snapshot) generates a snapshot image (e.g., R1) and a new version of the active file system (e.g., W2), while a writable (or read-write) snapshot generates a snapshot image (e.g., R1) and two new versions of the active file system (e.g., W2 and W3).

Turning first to FIG. 1, a block diagram is shown of an illustrative data storage system 100, including a number of hosts 110 coupled to one or more data storage subsystems 105. Each host 110 is a computer that can connect to clients, to data storage subsystems 105, and to each other. Each host 110 provides software and/or hardware interfaces, such as network interface cards and software drivers to implement Ethernet, Fibre Channel, ATM, SCSI, InfiniBand, and/or any other type of interface.

In one embodiment, a first host 110a includes a motherboard with a CPU-memory bus 114 that communicates with one or more processors 112 (e.g., dual processors). A processor 112 could be any suitable general-purpose processor running software, an ASIC dedicated to perform the operations described herein, a field programmable gate array (FPGA), etc. Also, one could implement embodiments using a single processor 112 in each host 110 or more than two processors 112 to meet more stringent performance requirements.

The first host 110a has cache memory 120 that includes a cache manager 113, a cache directory 115, and cache lines 116. The cache memory 120 is nonvolatile memory, volatile memory, or a combination of both. Nonvolatile memory protects data in the event of a power interruption or a host failure. Data includes user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory.

Each host 110 can include a bus adapter 122 between the CPU-memory bus 114 and an interface bus 124. Each host runs an operating system, such as Linux, UNIX, a Windows OS, or another suitable operating system. The first host 110a can communicate with the second host 110b through an interconnect 140, shown as connected to an adapter 125a to the interface bus 124. The PCI bus is one suitable interface bus 124, and the interconnect 140 may be any suitable known bus, SAN, LAN, or WAN technology, or the like. In one embodiment, the interconnect 140 is a dedicated Fibre Channel (FC) point-to-point link that connects to FC-PCI bus adapter 125 to provide fast point-to-point communication between the hosts 110.

In an alternative embodiment, the interconnect network 130 (e.g., a FC fabric) provides extra bandwidth for host-to-host communications. In this embodiment, link 128 and link 138 connect to the interconnect network 130, and the hosts 110 use link 128 and link 138 when available. FC standard software can set priority levels to ensure high priority peer-to-peer requests, but there can still be some arbitration overhead and latency in claiming ownership of the links. For example, if links 128 and 138 are busy transferring data when a write request arrives, that operation must complete before either link is free for arbitration.

If the interconnect 140 ever fails, communication between hosts 110 can be handled using the interconnect network 130. The interconnect network 130 can be implemented by interconnects used in data storage systems such as Fibre Channel, SCSI, InfiniBand, Ethernet, etc. Embodiments can use redundant communication between hosts 110 to ensure the data storage system 100 has high availability. As illustrated, the first host 110a can connect, or couple, to the first data storage subsystem 105a through the bus adapter 122, the interface bus 124, the adapter 125n, the link 128, the interconnection network 130, and the link 132. To connect to the second data storage subsystem 105b, the first host 110a can use the same I/O path, except the data passes through link 134. The second host 110b can use the same type of I/O path plus link 132 to communicate with the first data storage subsystem 105a or link 134 to communicate with the second data storage subsystem 105b.

As will be described more fully herein, operations are performed on blocks of the data storage subsystems 105. In some embodiments, the data storage subsystems 105 are implemented substantially as described in U.S. patent application Ser. No. 10/264,603, entitled, "SYSTEMS AND METHODS OF MULTIPLE ACCESS PATHS TO SINGLE PORTED STORAGE DEVICES," filed on Oct. 3, 2002, now abandoned and incorporated herein by reference. It is understood, however, that other storage device(s) or data storage subsystems 105 could be used in other embodiments.

Figure 2:
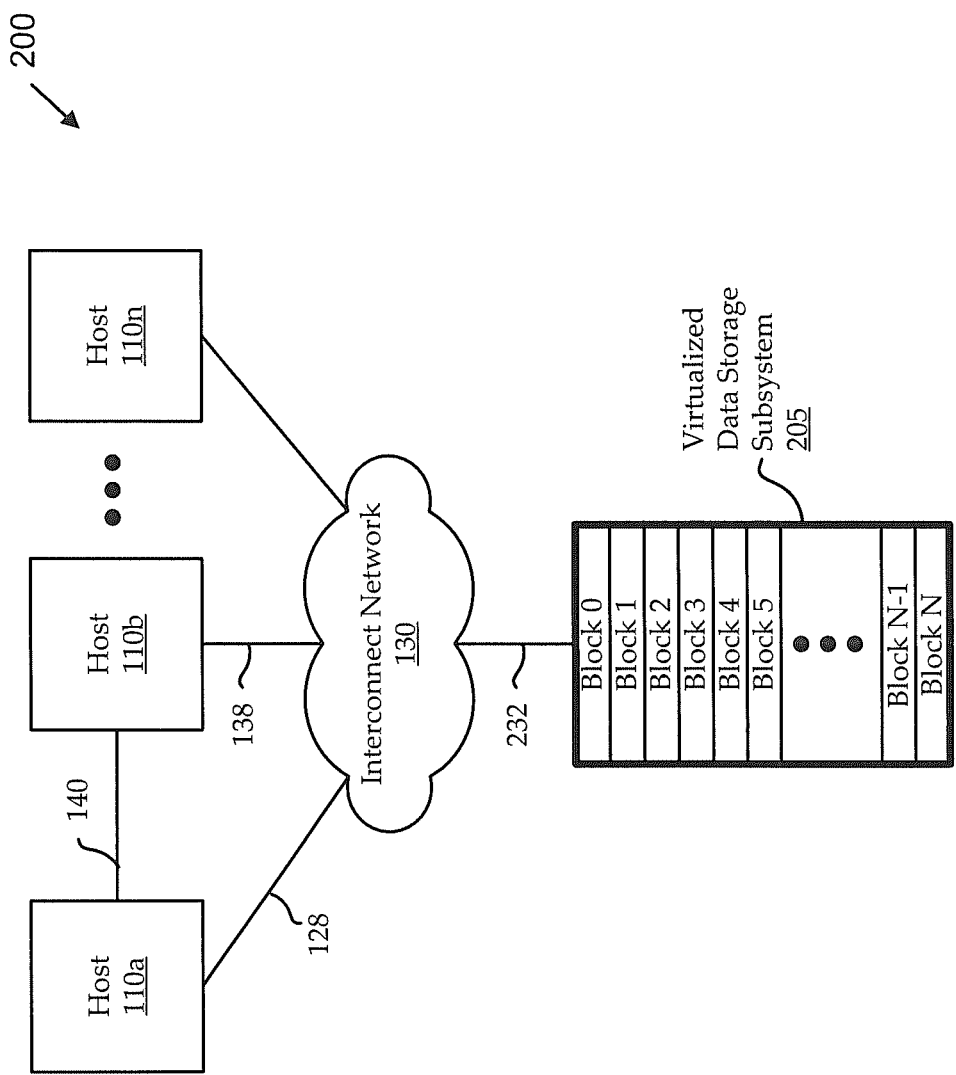
FIG. 2 shows a simplified block diagram of a portion of an illustrative data storage system, in which a number of hosts can access a virtualized data storage subsystem via an interconnect network.

FIG. 2 shows a simplified block diagram of a portion of an illustrative data storage system 200, like the one described with reference to FIG. 1, in which a number of hosts 110 can access a virtualized data storage subsystem 205 via an interconnect network 130. As illustrated in FIG. 1, the hosts 110 can communicate with each other and with one or more data storage subsystems 105 via the interconnect network 130. A file system may include blocks that span multiple data storage subsystems 105. Accordingly, when a host 110 accesses blocks of data in a file system, it may be accessing blocks across multiple data storage subsystems 105. For the sake of clarity, the blocks of the file system, whether physically in a single data storage system 105 or in multiple data storage systems 105, are shown as part of a single "virtualized" data storage subsystem 205.

For example, a first host 110a accesses data blocks from the virtualized data storage subsystem 205 via interconnect 128, interconnect network 130, and interconnect 232, while the second host 110a accesses data blocks from the virtualized data storage subsystem 205 via interconnect 138, interconnect network 130, and interconnect 232. Embodiments of interconnect 232 can include multiple interconnects between the interconnect network 130 and the multiple physical data storage subsystems 105. According to some embodiments, each storage device in the data storage subsystem is assigned a logical unit number (LUN) that is an identifier for the storage device. A virtual logical unit number (VLUN) is as an abstraction of the storage device(s) or the virtualization of the data storage subsystems such as a linear array of blocks as it appears to the data storage system users. In various embodiments, the implementation of a VLUN may be striped (i.e., spread) over multiple RAID groups for added performance, spread over sections of a RAID group for flexibility, or copied on multiple RAID groups for reliability. As shown, the storage devices of the data storage subsystem are virtualized as a file system employing contiguous fixed sized blocks 0-N, where the size of each block is some value (e.g., between one and 64 kilobytes).

It will be appreciated that there may be a number of ways to arrange file system data within the virtualized data storage subsystem 205. For example, as will be described more fully below, the virtualized data storage subsystem 205 can be used to store one or more active file systems, read-only snapshots, and supporting data (e.g., metadata files, indices, etc.). Accordingly, the specific data arrangements described below are intended only to be illustrative of certain embodiments, and other arrangements may be used without departing from the scope of the invention.

Figure 3:
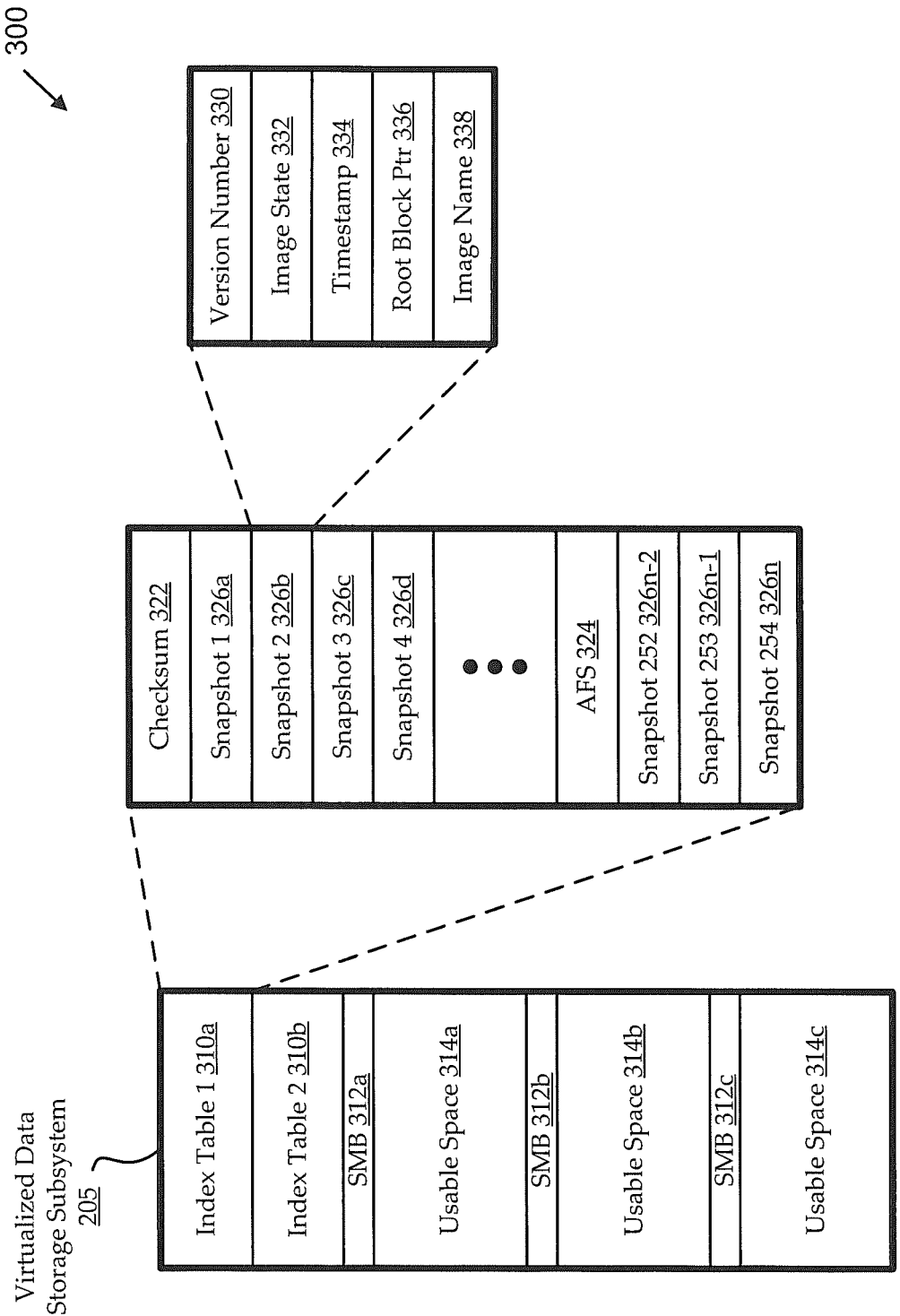
FIG. 3 shows various abstractions of an illustrative virtualized data storage subsystem, according to various embodiments.

FIG. 3 shows various abstractions of an illustrative virtualized data storage subsystem 205, according to various embodiments. The virtualized data storage subsystem 205 can be used to maintain (e.g., allocate, read, write, de-allocate, etc.) blocks for index tables 310, space maps 312 ("space map blocks, or SMBs), and usable space 314 for data storage. Different implementations allocate different amounts of blocks to index tables 310, depending on the size of each block, the number of concurrent snapshot images supported, etc. For example, three 8-kilobyte blocks may be sufficient to support an index table of 254 snapshot images.

In some embodiments, as illustrated, the virtualized data storage subsystem 205 can include a pair of index tables 310 (e.g., six 8-kilobyte blocks) to allow the host (e.g., hosts 110 of FIG. 1) to alternate writes between the index tables 310 to ensure recovery in case of a data storage system failure. If the system fails during a write to one index table (e.g., 310a), the host can retrieve the unmodified copy of the other index table (e.g., 310b). Other embodiments use other techniques, such as write journaling, to protect against system failure during index table writes. The remainder of the storage can be allocated to space map blocks 312 and usable space 314 for data storage.

Each index table 310 can include data to verify data integrity. For example, some implementations use algorithmic data, such as a checksum 322, a cyclic redundancy check, or a digital signature. The index table 310 further provides an index to the snapshot images 326 and the one or more active file systems 324 (e.g., each entry in the index table 310 represents a snapshot image 326 or an active file system 324). In the illustrative implementation, three 8-kilobyte blocks are used to support an index range of 1-255.

In various embodiments, each snapshot image 326 and active file system 324 has one or more associated attributes. As illustrated, the attributes can include a version number 330, image state 332, timestamp 334, root block pointer 336, and/or image name 338. In some embodiments, when the data storage system (e.g., the host) takes a snapshot of an active file system 324, it assigns the snapshot image 326 (and any generated active file systems 324, as explained more fully below) a unique version number 330, such as a 32-bit unsigned integer that increases monotonically. Certain implementations do not reuse version numbers even as snapshot images 326 or active file systems 324 are deleted or made obsolete.

The image state 332 can be implemented in various ways. According to some embodiments, the image state 332 can be one of the following: "active," representing an active file system 324; "in-use snapshot," representing a snapshot image 326 that users can access; "free," representing blocks available for writing by a snapshot image 326 or active file system 324; "deleted snapshot," representing a snapshot image that has been deleted by a user, but for which its space map block 312 has not been removed by a cleaner process or thread; or "obsolete snapshot," representing a snapshot image 326 for which a user has reverted to an earlier snapshot image 326, and for which the cleaner process or thread has not yet removed its space map block 312.

Other attributes can be implemented in various ways. In some embodiments, the timestamp 334 indicates a time and date when the snapshot image 326 or active file system 324 was created. Embodiments of the root block pointer 336 provide the address of the root block in the hierarchical structure of the image (e.g., snapshot image 326). Embodiments of the image name 338 include a character string used to easily identify the image to users.

Figure 4:
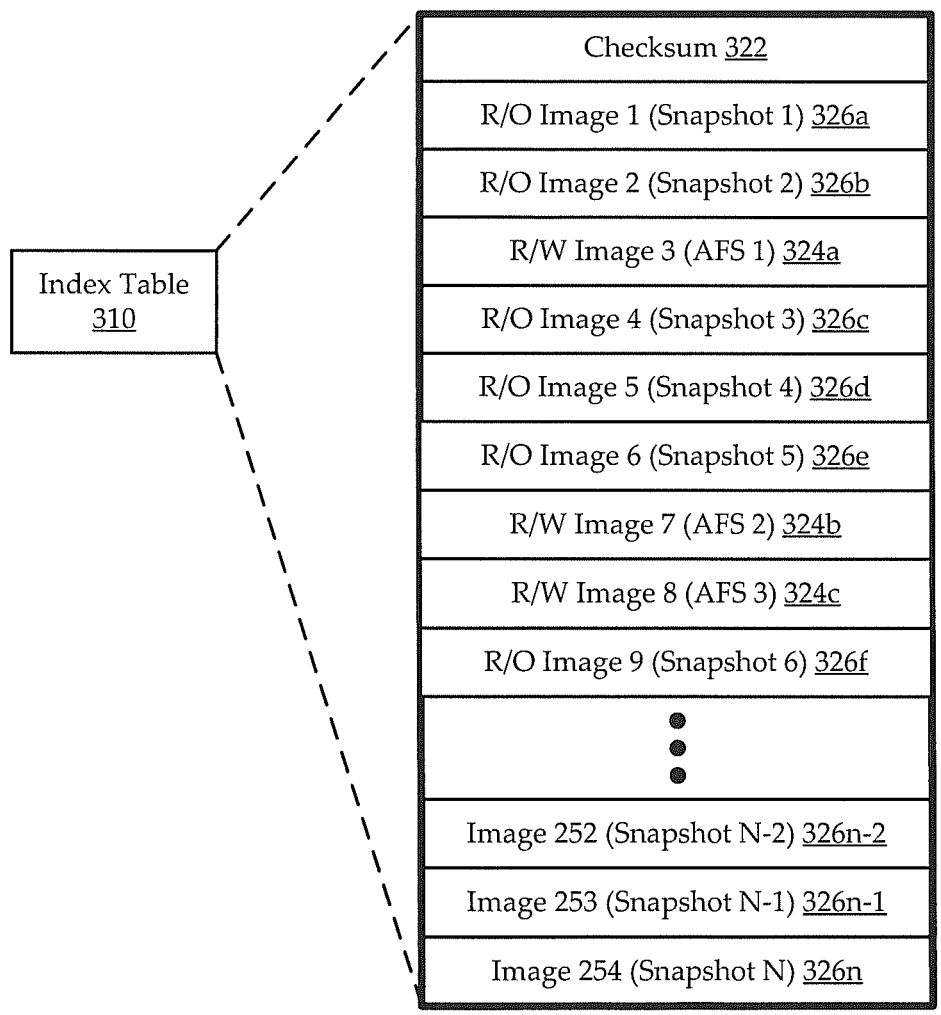
FIG. 4 shows an illustrative index table for use with multiple, concurrent active file system versions, according to various embodiments.

In some embodiments, writable snapshot functionality is provided to generate multiple active file system 324 versions. FIG. 4 shows an illustrative index table 310 for use with multiple, concurrent active file system 324 versions, according to various embodiments. The index table 310 provides an index to all the various images, including read-only ("R/O") images representing snapshot images 326 taken of one of the active file systems 324 at a particular time, and any concurrent versions of active file systems 324. For the sake of illustration, the index table 310 of FIG. 4 includes three active file systems 324 and a number of read-only snapshot images 326.

Figure 5A:
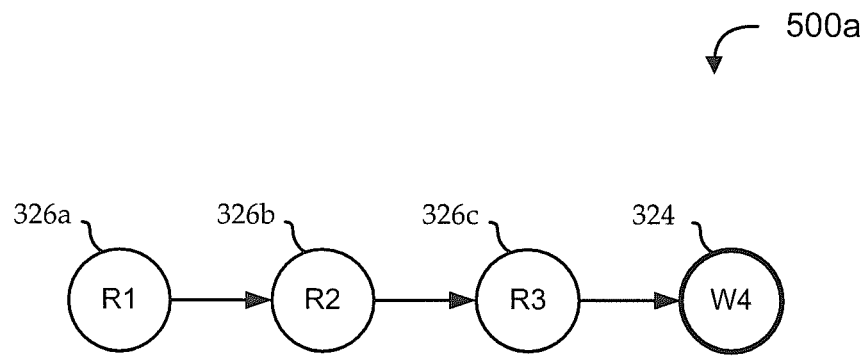
FIGS. 5A and 5B show tree structures of an illustrative read-only snapshot operation and an illustrative writable snapshot operation, respectively.
Figure 5B:
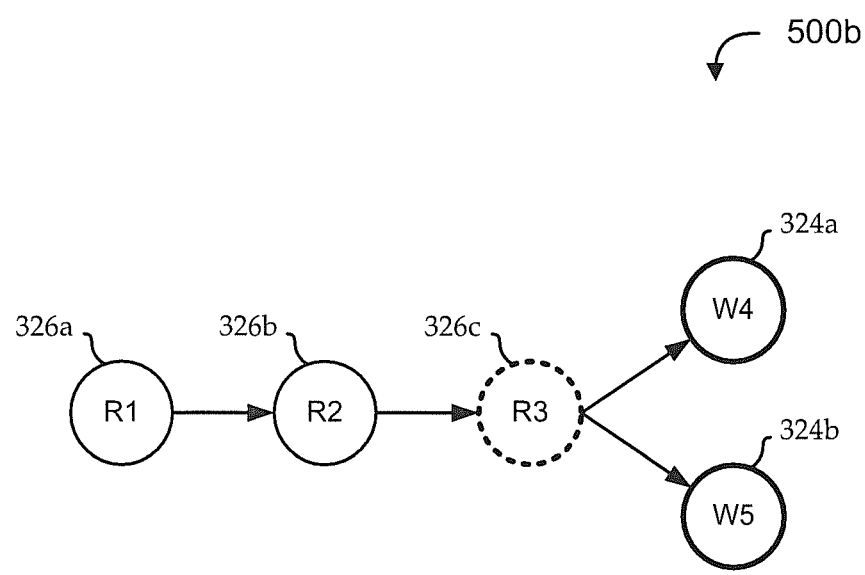

FIGS. 5A and 5B show tree structures 500 of an illustrative read-only snapshot operation and an illustrative writable snapshot operation, respectively. While a read-only snapshot will generate a read-only snapshot image 326 and a new active file system image 324 (a new version of the AFS that was used to take the snapshot), a writable snapshot will generate a read-only snapshot image 326 and two new active file system images 324 (two new and independent versions of the AFS that was used to take the snapshot).

FIG. 5A shows a case after three read-only snapshots have been taken of the active file system. In the illustrated case, the active file system is initially generated as W1 (e.g., a writable version of the active file system at index location "1" in an index table). A first read-only snapshot is taken, generating a read-only snapshot image 326 of W1 at index location "1" (indicated as "R1"), and generating a new version of the active file system at index location "2" (indicated as "W2"). Subsequently, a second read-only snapshot is taken of the active file system (now W2), resulting in "R2" and "W3"; and a third read-only snapshot is taken of the active file system (now W3), resulting in "R3" and "W4." The full tree (assuming no snapshot images 324 have been deleted) includes "R1," "R2," "R3," and "W4." It will be appreciated that this essentially mimics the traditional case of read-only snapshot functionality.

FIG. 5B shows a case after two read-only snapshots and a writable snapshot have been taken of the active file system. As in the case of FIG. 5A, the active file system is initially generated as W1; a first read-only snapshot is taken, generating a read-only snapshot image 326 ("R1") and a new version of the active file system ("W2"); and a second read-only snapshot is taken, generating a read-only snapshot image 326 ("R2") and a new version of the active file system ("W3"). Subsequently, a writable snapshot is taken of the active file system (now W3), which generates a read-only snapshot image 326 ("R3") and two new versions of the active file system ("W4" and "W5"). The full tree includes "R1," "R2," "R3," "W4," and "W5."

Notably, a result of the writable snapshot is that each of W4 and W5 is an independently writable version of the file system that tracks back to the same R3 node of the tree. Accordingly, R3 becomes an "inflection point," the implications of which will be described more fully below. It will be appreciated from the above that each node can have zero, one, or two children. An active file system 324 has zero children, a snapshot image 326 from a read-only snapshot operation has one child (e.g., an active file system 324 or another snapshot image 326), and a snapshot image 326 that was generated as an inflection point from a writable snapshot operation has two children (e.g., two active file systems 324, two snapshot images 326, or one of each). Some embodiments may allow a subsequent snapshot to be taken of a snapshot image 326 (i.e., rather than allowing snapshot operations only on active file systems 324).

It is worth noting that writable snapshots provide a number of features in addition to facilitating concurrent handling of multiple active file systems 324. One feature is that the additional active file systems 324 are each more efficient than a comparable "volume copy" or "clone." For example, using a pointer-based snapshot operation allows the new active file system to be created, even in a NAS-based architecture, in a very short time and using very small amounts of system resources. Another feature is that the writable snapshot operation involves substantially the same overhead to perform as the read-only snapshot operation. Yet another feature is that conventional file system operations (e.g., provisioning, backup, restore, replicate, etc.) are left substantially unchanged. Still another feature is that writable snapshot functionality can be naturally integrated with file system operations involving multiple storage pools (e.g., data progressive environments, auto-tiering, etc.). And another feature, as discussed above, is that snapshot images 326 and active file systems 324 generated from writable snapshots support traditional snapshot-related operations, like snapshot restore.

It is also worth noting that the ability to access multiple active file systems 324 concurrently allows for a number of use cases that are difficult or impossible to provide with read-only snapshot images 326 and a single active file system 324. Embodiments support independent network file system (NFS) exports and/or common internet file system (CIFS) shares for each active file system 324. Accordingly, developers can configure applications to point to a particular version of the file system. In this way, for example, multiple developers could concurrently use multiple active file systems 324 to develop or test different applications; one developer could concurrently test different versions of an application on different versions of the active file system 324, etc. In some embodiments, initial NFS exports and/or CIFS shares are copied (e.g., as a template) from a parent active file system 324 when a new version of an active file system 324 is generated. Notably, from the perspective of an administrator, each active file system 324 looks substantially like it would if there was only a single file system 324 (e.g., a single active file system 324 can be implemented as a degenerate case of the multiple active file systems 324). For example, each active file system 324 can be configured to share the same allocations, tiers, quality of service, slammer assignments, etc.

Figure 6:
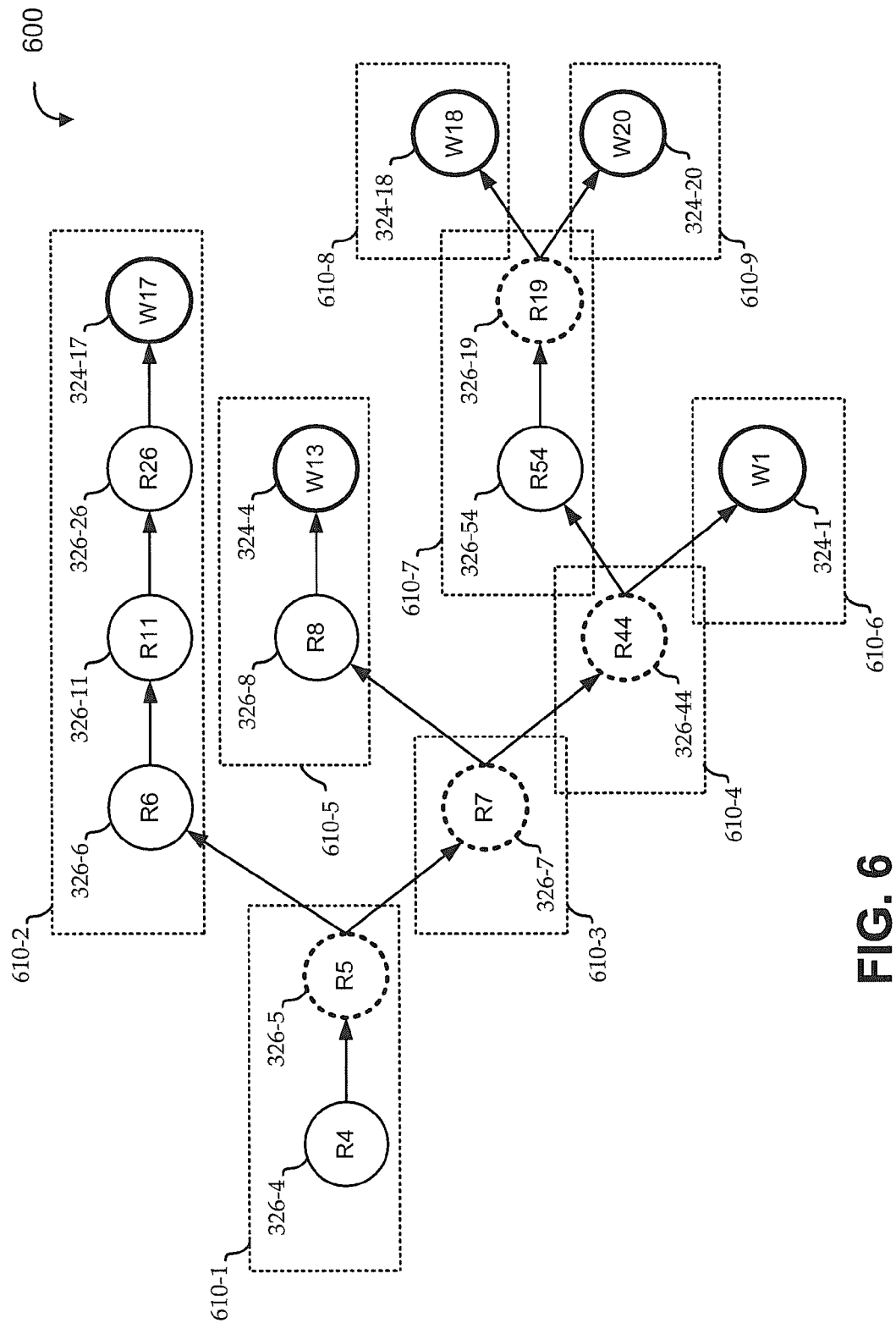
FIG. 6 shows a more complex tree structure of an illustrative virtualized data storage subsystem having a number of concurrent active file systems and snapshot images.

FIG. 6 shows a more complex tree structure 600 of an illustrative virtualized data storage subsystem having a number of concurrent active file systems 324 and snapshot images 326. In some implementations, each snapshot image 326 or active file system 324 is assigned a unique version number which may never be reused. However, for space-efficiency reasons, each version number that is currently in use is associated with one of a limited number of index values. Accordingly, the index values may be reused over time, for example, as images are deleted or become obsolete. As such, sequential images may not necessarily have sequential index locations. For example, the tree structure 600 shows a writable snapshot of a version of the active file system at index "44" (i.e., what would have been labeled "W44") generating "R44" 326-44, "W54" (which subsequently became "R54" 326-54, as illustrated), and "W1" 324-1.

The tree structure 600 is the result of a number of read-only and writable snapshots taken over time, beginning with an active file system, "W4." For example, the sequence of events occurred as follows:

| Time | Operation | Result |
|---|---|---|
| 1 | R/O Snapshot of W4 | R4, W5 |
| 2 | R/W Snapshot of W5 | R5, W6, W7 |
| 3 | R/O Snapshot of W6 | R6, W11 |
| 4 | R/W Snapshot of W7 | R7, W8, W44 |
| 5 | R/O Snapshot of W8 | R8, W13 |
| 6 | R/O Snapshot of W11 | R11, W26 |
| 7 | R/W Snapshot of W44 | R44, W1, W54 |
| 8 | R/O Snapshot of W26 | R26, W17 |
| 9 | R/O Snapshot of W54 | R54, W19 |
| 10 | R/O Snapshot of W19 | R19, W20 |

After that sequence of events, there are five concurrent active file systems 324 (i.e., W1, W13, W17, W18, and W20) and four inflection points (i.e., R5, R7, R19, and R44). Some embodiments display the tree structure 600 to the user in a format that shows its parentage. Other embodiments can display the file system as a set of sequential images, which may be less confusing for certain users. For example, the results of the above sequence may be displayed as follows:

| Image Name | Creation Time |
|---|---|
| AFS (W20) | 10 |
| AFS (W18) | 10 |
| Snapshot (R19) | 9 |
| AFS (W17) | 8 |
| Snapshot (R54) | 7 |
| AFS (W1) | 7 |
| Snapshot (R26) | 6 |
| AFS (W13) | 5 |
| Snapshot (R44) | 4 |
| Snapshot (R8) | 4 |
| Snapshot (R11) | 3 |
| Snapshot (R7) | 2 |
| Snapshot (R6) | 2 |
| Snapshot (R5) | 1 |
| Snapshot (R4) | 1 |

In some implementations, the various active file systems 324 are treated symmetrically, or in a substantially egalitarian fashion. For example, from the perspective of the virtualized data storage subsystem (e.g., the index table), the active file systems 324 may each be created in the same way, so that no particular active file system 324 is special with regard to form or function. Indeed, the active file systems 324 may still be treated differently from the perspective of the user. For example, though theoretically symmetric, the user may use one active file system 324 as the "production" file system, while the active other file systems 324 may be "development" or "test" environments. Alternative embodiments may be asymmetric or non-egalitarian. Techniques (e.g., code, metadata, etc.) may be used to maintain one active file system 324 as a primary or special file system. For example, it may be desirable to maintain a production database as a linear flat file to facilitate sequential querying. It will be appreciated that, if contents of the database change (e.g., files are added, removed, etc.) in only one active file system 324, that active file system 324 may only be able to maintain its linearity at the expense of the linearity of other active file systems 324.

Certain functionality is supported by identifying branches 610 of the tree structure 600. A "branch" can be defined as all the nodes of the tree structure 600 that trace back from an active file system 324 or an inflection point to a node immediately following an inflection point or the top of the tree. For example, as illustrated, a first branch 610-1 includes R4 and R5, and a second branch 610-2 includes R6, R11, R26, and W17. The illustrated tree structure includes nine branches 610.

It will be appreciated that, within a single branch 610, there is effectively only one active file system and no inflection point. Accordingly, intra-branch operations may look similar or identical to those of a traditional file system having no writable snapshot functionality. However, writable snapshot support may involve additional functionality and technique, for example, in support of operations that span an inflection point. In various embodiments, support for the additional writable snapshot functionality involves additional metadata (e.g., the "retire" file), modifications to "compaction," and or other techniques, all of which are described more fully below.

Figure 7:
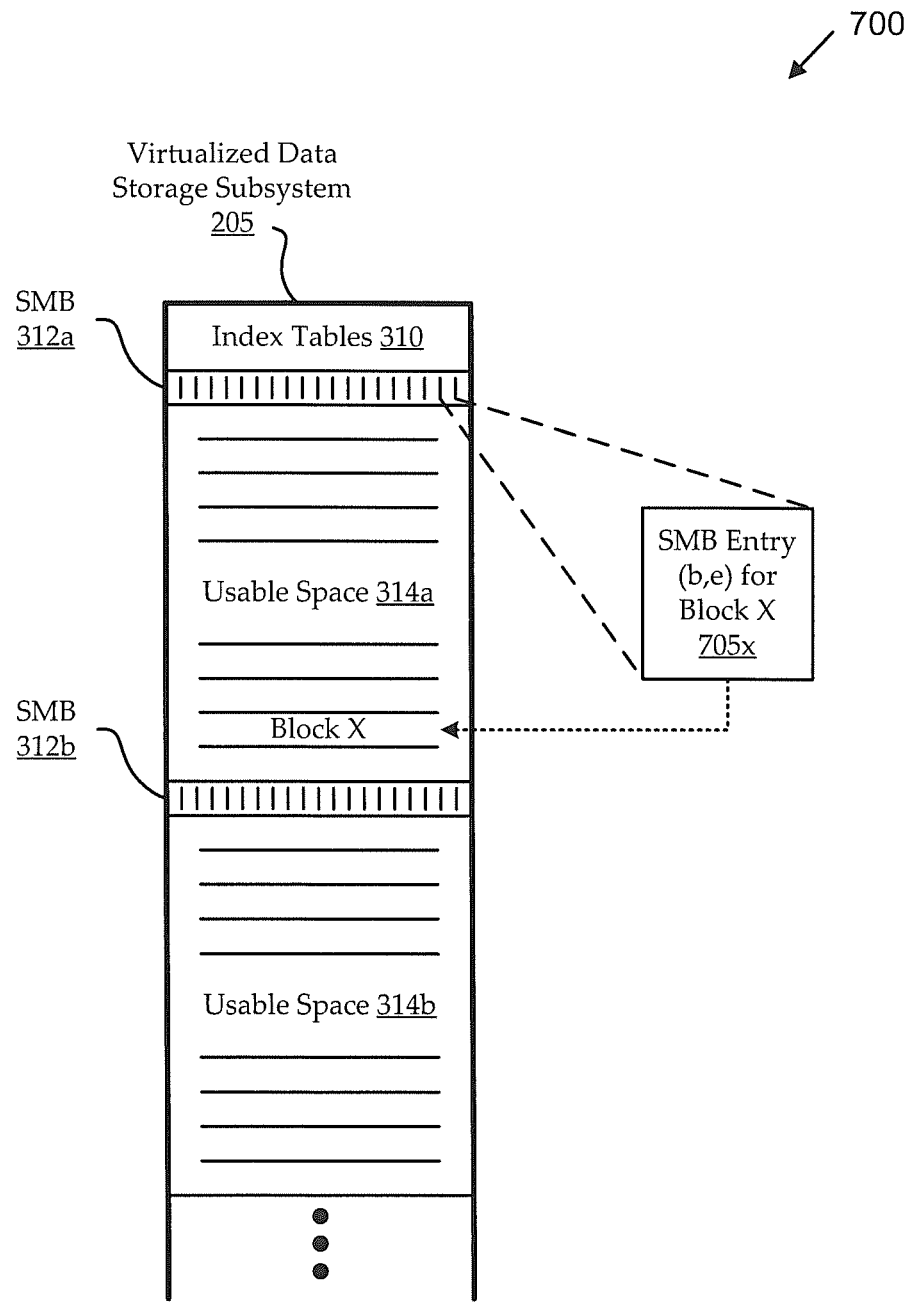
FIG. 7 shows an illustrative virtualized data storage subsystem with an illustrative data construct for space maps and usable space for data storage.

Referring back to FIG. 3, other than the blocks allocated for index tables 310, the remaining blocks of the virtualized data storage subsystem 205 are used for space maps 312 and usable space 314 for data storage. FIG. 7 shows an illustrative virtualized data storage subsystem 205 with an illustrative data construct for space maps 312 and usable space 314 for data storage. As illustrated, each space map block 312 keeps track of the blocks in its usable space 314 for data storage. For example, a space map block 312 can keep track of 2,047 blocks of usable space 314.

Embodiments of the space map blocks 312 contain pairs of indexes referred to herein as "space map block entries" 705. For example, each space map block entry 705 uses an 8-bit word to represent any of 254 snapshot images 326 or active file systems 324. The space map block 312 associates each of its set of usable space 314 blocks with a space map block entry 705 that is effectively an index into the index table 310. Each space map block entry 705 has a beginning value "b" that indicates the first image (e.g., snapshot image 326 or active file system 324) to refer to the usable space 314 block and an ending value "e" that indicates the last image to refer to the usable space 314 block. Thus, each space map block entry 705 "(b, e)" in the space map block 312 is used to track the usage of an associated block in the usable space 314.

As described above, the space map block entries 705 can indicate index numbers of images, which can be translated to version numbers via the index table 310. This allows the space map blocks 312 to remain relatively small. However, in alternate embodiments, each space map block entry 705 contains a pair of version numbers (e.g., 32-bit) that represent snapshot images 326 or an active file system 324. Thus, each version pair "(b, e)" in the space map block 312 would be used to track the usage of an associated block in the usable space 314 using the versions directly without the added level of abstraction provided by the indices.

In some embodiments, "0" is used to indicate a lack of any specific image reference. When "b" is "0," there is no earliest image (and, therefore, there should be no image at all) that is referring to the associated block; and when "e" is "0," there is no latest image that is referring to the associated block (i.e., at least one active file system 324 is still referring to the associated block, or a latest referring image has not yet been determined). When an earliest or latest image is determined to be referring to the associated block, "b" or "e" will indicate the index in the index table 310 (or version number) that points to the earliest or latest image, respectively. In a first example, a space map block entry 705 of "(0, 0)" indicates that the associated block is free to use by a snapshot image or the active file system (i.e., the block is not currently allocated). In a second example, a space map block entry 705 of "(12, 44)" indicates that the earliest image to refer to the associated block is whichever version is associated with index "12" (e.g., R12) in the index table 310, and the latest image to refer to the associated block is whichever version is associated with index "44" (e.g., R44) in the index table 310. In a third example, a space map block entry 705 of "(12, 0)" indicates that the earliest image to refer to the associated block is whichever version is associated with index "12" (e.g., R12 or W12) in the index table 310, and the associated block is either being referred to by at least one active file system 324 (and possibly one or more other snapshot images 326) or the latest image to refer to the associated block has not yet been determined. Notably, in a traditional snapshot environment, where only a single active file system 324 can exist, any space map block entry 705 of "(b, 0)" indicates that the block is in use by the active file system 324. However, when multiple active file systems can exist concurrently, a space map block entry 705 of "(b, 0)" is insufficient to indicate which one or more of the active file systems 324 is using the associated block.

Further functionality relating to writable snapshots and handling of multiple active file systems 324 will be described more with reference to the methods below. It will be appreciated that, in some embodiments, the methods are performed by systems, such as those described with reference to FIGS. 1 and 2. In alternative embodiments, other system configurations can be used. Further, though the methods are described serially below, the steps can be performed in parallel, for example, asynchronously or in a pipelined manner, or in different orders (except where otherwise indicated). Embodiments implement method steps using one or more computational devices (e.g., computers). For the sake of clarity, the methods are described as being performed by a host, though embodiments may use multiple hosts to perform the method steps.

To provide context, it is assumed that a file system is initialized with a single active file system 324 (i.e., prior to taking any read-only or writable snapshots). Some embodiments implement this initialization in a substantially identical fashion to systems providing only read-only snapshot functionality. In one embodiment, creation of the file system begins by the host setting all space map block entries 705 to "(0, 0)" to indicate that the corresponding blocks are free to use. The host selects a starting version number and an index (e.g., an 8-bit number, "a") to represent the active file system 324, and loads the index into the index table 310 of FIG. 3. The host selects the first available space map block 312 and loads the first space map block entry 705 with "(a, 0)." In the index table 310 at location "a," the host sets the attributes, including setting the starting version number, setting the image state to "active," setting the timestamp to the current date and time, and setting a starting root block pointer, and the host calls an algorithm to verify the data integrity (e.g., checksum) of the snapshot attributes and stores the results in the index table 310. The host may write the index table to non-volatile storage.

Figure 8:
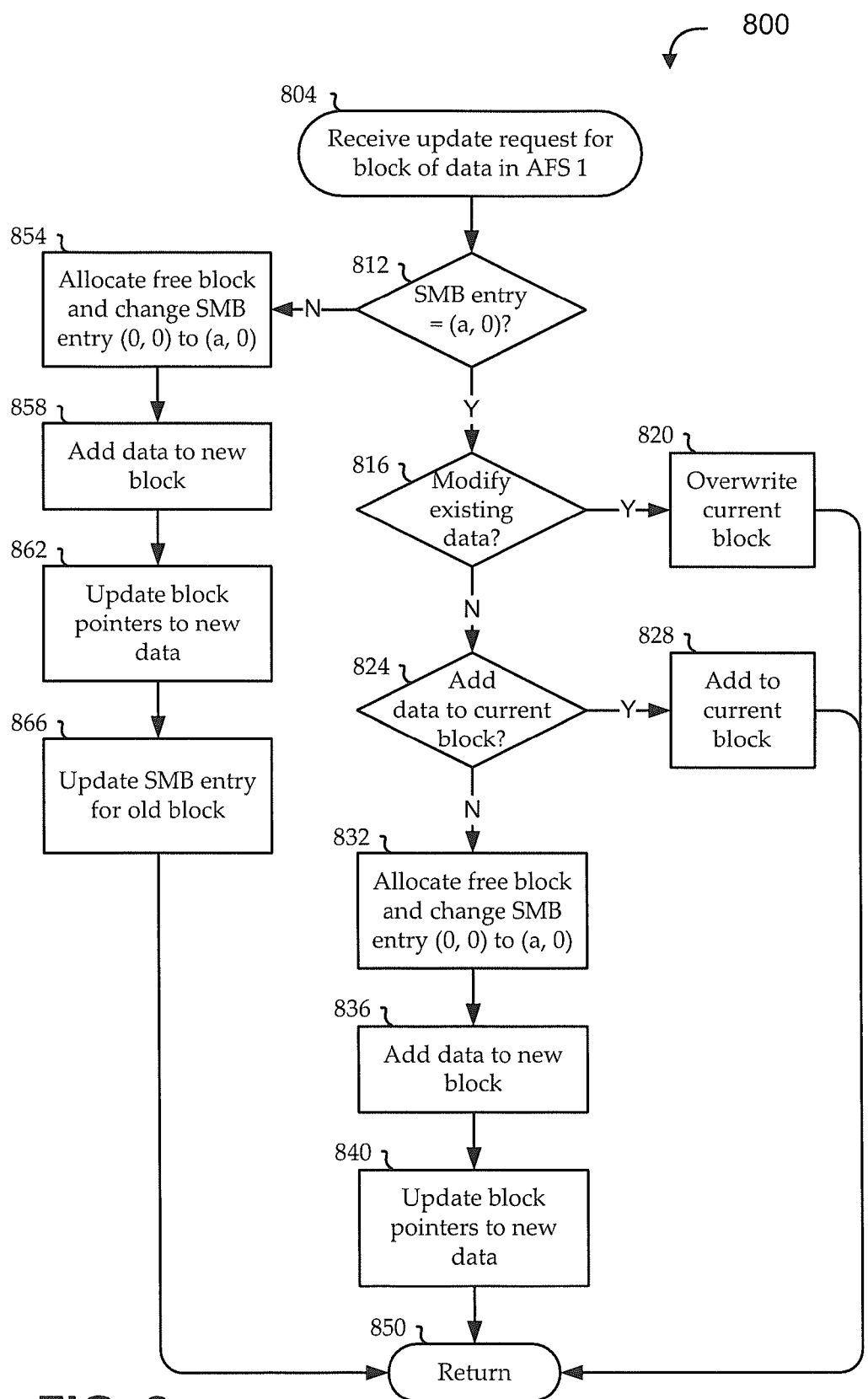
FIG. 8 shows a flow diagram of an illustrative method for managing block updates, according to various embodiments.

Turning to FIG. 8, a flow diagram is shown of an illustrative method 800 for managing block updates, according to various embodiments. The method 800 begins at stage 804 by receiving an update request for a particular block of data in one of the active file systems 324 (e.g., AFS 1, having an index location of "a"). As discussed above, the active file system 324 associated with the data update may be understood from the NFS exports, CIFS shares, etc. At stage 812, the host reads the space map block entry 705 of the associated received data to determine if that block is used by AFS 1 only. For example, if the index of AFS 1 is "a," the space map block entry 705 of the block where the data is stored will be "(a, 0)."

If it is determined that the block is being used only by AFS 1, a further determination is made at stage 816 as to whether the data update represents a modification of existing data or an addition to existing data. If the received data is a modification of existing data, the host overwrites the block at stage 820 and returns to normal operation at stage 850. If the received data is determined to be an addition to the existing data, the host determines at stage 824 whether the current block has adequate space to hold all the received data. If there is adequate space in the current block, the host adds the received data to the current block at stage 828 and returns to normal operation at stage 850. If not, at stage 832, the host allocates a free-to-use block for storage of the additional data and changes the associated space map block entry 705 from "(0, 0)" to "(a, 0)." At stage 836, the host adds the received data to the newly allocated block. At stage 840, the host updates the file system block pointers to point to the new data and the method 800 returns to normal system operation at stage 850.

Returning to stage 812, if the current space map block entry 705 of the associated block is not "(a, 0)," it will be "(b, 0)," indicating that the block is being used by at least one earlier snapshot image 326 at index "b." Accordingly, it is desirable to maintain that block in its current form for continued reference by at least snapshot image 326 "b," and the method 800 proceeds in the same way, regardless of whether the change is a modification or an addition to the block data. At stage 854, the host allocates a free-to-use block for storage of the additional data and changes the associated space map block entry 705 from "(0, 0)" to "(a, j)." At stage 858, the host adds the received data to the newly allocated block. At stage 862, the host updates the file system block pointers to point to the new data. To maintain proper references, embodiments also update the space map block entry 705 of the old block. The method 800 can then return to normal system operation at stage 850.

Updating the space map block entry 705 of the old block (e.g., according to stage 866) can proceed essentially according to two general use case categories. One use case category occurs when the "b" and "e" values are both pointing to images within a single branch 610 (i.e., not across an inflection point). For example, referring to FIG. 6, an illustrative space map block entry 705 falling within this use case category is "(6, 0)." Because only a single active file system 324 is in the branch 610 with index 6, this space map block entry 705 indicates substantially unequivocally that the particular block is being used by all of snapshot image R6 326-6, snapshot image R11 326-11, and snapshot image R26 326-26, and active file system W17 324-17. The other use case category occurs when the "b" and "e" values point to images in different branches 610 (i.e., across an inflection point). For example, referring again to FIG. 6, an illustrative space map block entry 705 falling within this use case category is "(54, 0)." In this case, while the block is clearly being used by snapshot image R54 326-54, it is unclear whether the block is also being used by active file system W18 324-18, active file system W20 324-20, or both.

Figure 9:
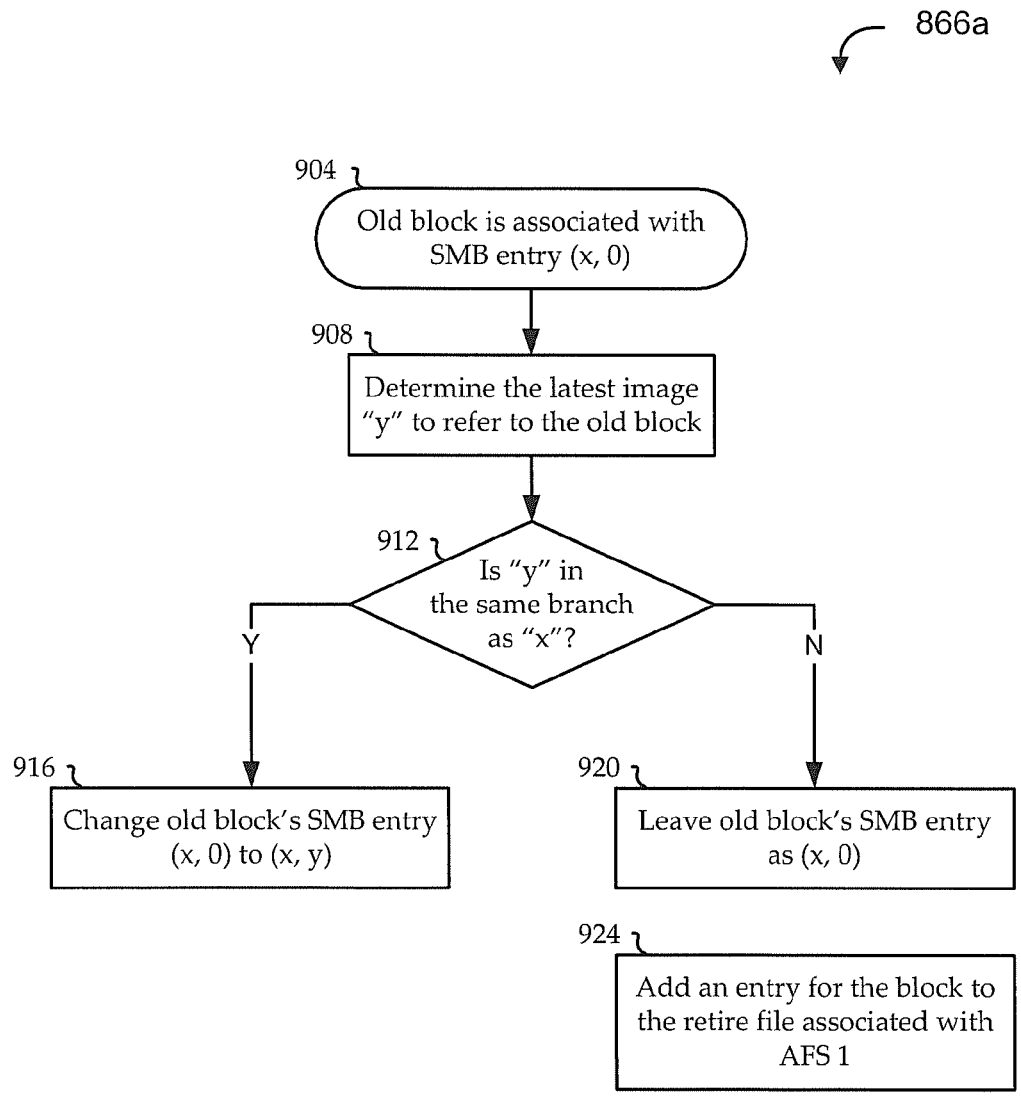
FIG. 9 shows a flow diagram of an illustrative method for updating the space map block entry of a block after a modification, according to various embodiments.

FIG. 9 shows a flow diagram of an illustrative method 866a for updating the space map block entry 705 of a block after a modification, according to various embodiments. For context, stage 904 shows that the old block is associated with space map block entry 705 "(x, j)," where "x" is the index of the earliest snapshot image 326 referring to the block. At stage 908, the latest image to use the block is determined to be at index "y." A determination is made at stage 912 as to whether "y" is in the same branch 610 as "x." If so, this would represent the first use case category described above; and, if not, this could represent the second use case category described above.

If "x" and "y" are in the same branch 610, there are no inflection points to worry about, and the case can be handled using traditional techniques (i.e., techniques that account only for read-only snapshots). At stage 916, the space map block entry 705 of the old block is changed from "(x, 0)" to "(x, y)." If "x" and "y" are in different branches 610, there may be more than one latest image referring to the block. At stage 920, the space map block entry 705 of the old block is left at "(x, 0)."

While the "e" value in the space map block entry 705 is not being updated, embodiments may still desire to update "e" at some subsequent time. If "e" is never updated, the block may never be able to be reused. Accordingly, embodiments maintain a record of all blocks for which updating of the "e" value has been deferred in a "retire" file. Each active file system 324 may have its own retire file. At block 924, an entry for the old block is added to the retire file associated with AFS 1 (assuming that the data change was associated with AFS 1, as in the context provided by the method 800 of FIG. 8). As will be described below, future branch deletion may cause "b" and "e" values for a given block in the retire file to become part of a shared branch 610, such that the "e" value can be updated at that time.

In some embodiments, the retire file is a new file in a metadata directory for the file system. The retire file is modified using standard snapshot rules and is inherited by child images through snapshot operations. Suppose that a writable snapshot is taken of an active file system W1 324-1, resulting in snapshot image R1 326-1, active file system W2 324-2, and active file system W3 324-3. Because the retire file is part of the blocks of data that made up the parent active file system W1 324-1, the retire file will be inherited by all the children (R1, W2, and W3). Each of the child active file systems 324 (W2 and W3) can independently modify their respective retire files according to independent data modifications that occur in those active file systems 324. However, those changes will not be backwardly inherited (i.e., the changes to the retire file of W2 will not propagate to the retire files of either R1 or W3). As such, if the file system is restored back to R1, the retire file will automatically be restored back to its state at that time, as well.

Some embodiments of the retire file include entries that list the appropriate block number and version number. Use of the version number instead of the index number allows the retire file to maintain a correct version reference even when index numbers are reused without having to go through the retire files and update those entries. For example, updating index values in a retire file associated with a snapshot image 326 would involve writing to blocks of a read-only image, which may be undesirable. Certain embodiments of the retire file use compression techniques to save space. For example, it is likely in many instances that the same version will be written in the retire file for many entries in a row. Rather than rewriting the entire version each time, a relatively small amount of data can be used to indicate that the version number for a particular entry is the same as the version number for the preceding entry. For example, an illustrative retire file may look as follows:

| Block Number | Version Number |
| --- | --- |
| 1002 | 10583 |
| 826 | 65993 |
| 828 | 'Same' |
| 830 | 'Same' |
| 832 | 'Same' |
| 834 | 'Same' |
| 258 | 10631 |

Figure 10:
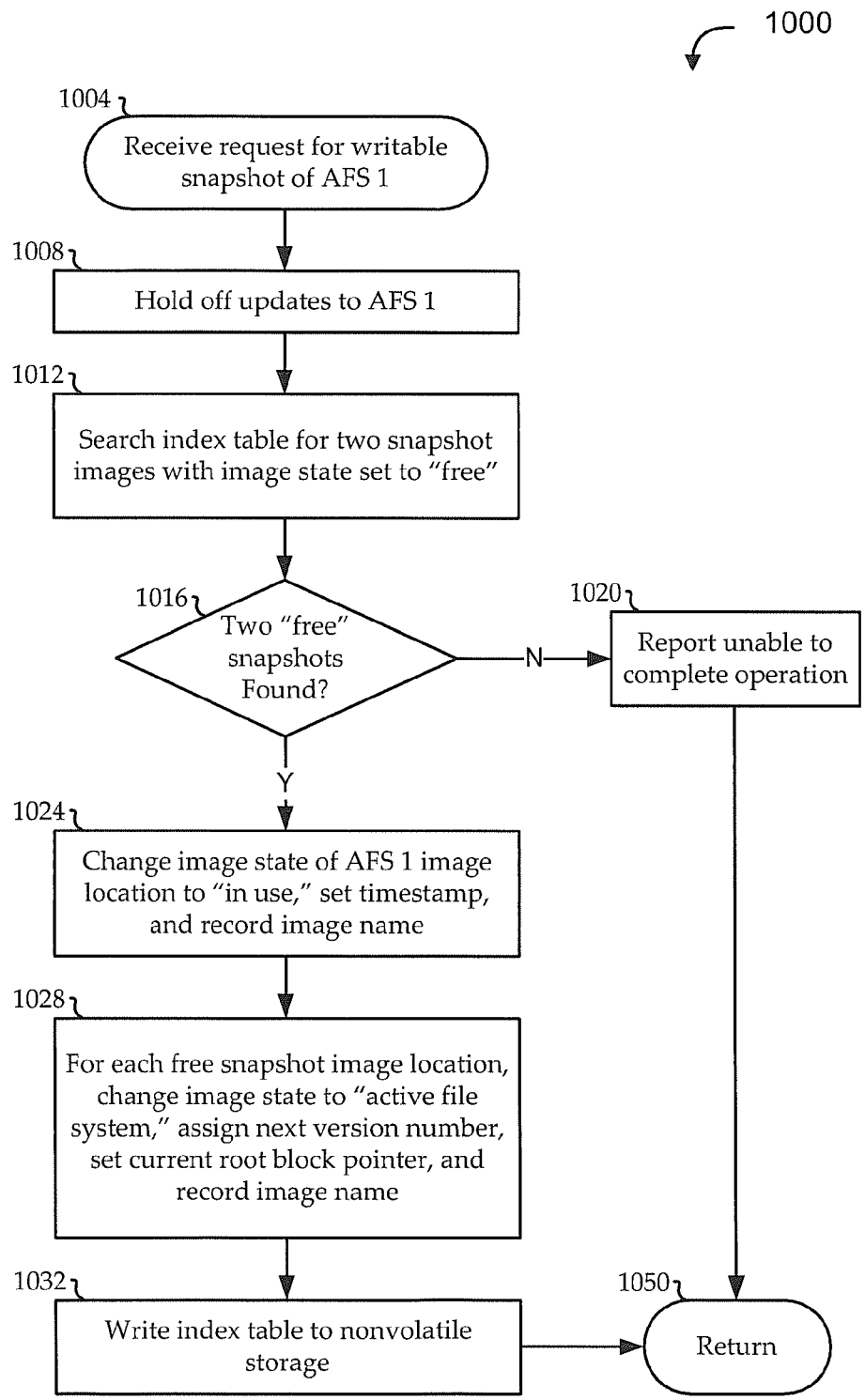
FIG. 10 shows a flow diagram of an illustrative method for creating a writable snapshot, according to various embodiments.

FIG. 10 shows a flow diagram of an illustrative method 1000 for creating a writable snapshot, according to various embodiments. It will be appreciated that a read-only snapshot can be created substantially as described in U.S. Pat. No. 6,959,313, which has been incorporated herein. The method 1000 begins at stage 1004 when a request is received for a writable snapshot of an active file system 324 (e.g., "AFS 1"). At stage 1008, the method 1000 holds off (e.g., buffers) any updates to AFS 1 while the snapshot is being created. This helps ensure that the snapshot is being taken of a stable file system.

As discussed above, a writable snapshot creates a read-only snapshot image 326 and two active file systems 324. Accordingly, at stage 1012, the index table 310 is searched for two "free" snapshot image locations (e.g., with their image states set to "free," as described above). At stage 1016, a determination is made as to whether two free locations were found. If not, embodiments may report that the operation could not be completed at stage 1020. For example, an error may be returned to the user, a log entry may be generated, etc. The system can then resume normal operation at stage 1050. In some embodiments, the user can delete one or more snapshot images 326 and try again, or the method 1000 may allow selection of snapshot images to delete, after which it may automatically return to an appropriate stage (e.g., to stage 1016).

If two free locations are found at stage 1016, the writable snapshot operation can proceed. At stage 1024, the image state of AFS 1 is changed from "active file system" to "in use" to indicate an in use snapshot image 326. Attributes may also be set. For example, the timestamp of the in use snapshot image 326 can be set to the current date and time and an image name can be recorded (e.g., via a prompt to the user, automatically generated by the host, etc.). The version number and root block pointer can remain where they were set prior to the snapshot operation being requested.

At stage 1028, the two active file systems 324 are created. The image state for each of the two free locations is changed from "free" to "active file system" and a next (e.g. or otherwise unique) version number can be assigned to each. The root block pointer is set to the same location as that of the in-use snapshot image 326. Respective image names can also be recorded. In some embodiments, the method 1000 writes the index table to nonvolatile storage at stage 1032. Normal system operation can then resume at stage 1050.

A number of other file system operations are available, including provisioning, backup, restore, replicate, delete, and compaction. The presence of multiple active file systems 324 will not impact many of these operations in most instances. Accordingly, those operations can be implemented substantially as described in U.S. Pat. No. 6,959,313, which has been incorporated herein, except where otherwise described herein. For example, to account for the presence of inflection points and/or multiple active file systems 324, additional techniques are described for branch deletion, inter-branch snapshot restore, and compaction.

Turning first to delete operations, some traditional techniques for deleting a snapshot image 326 involve changing the image state for the index location associated with that snapshot image 326 from "in use" to "delete" (e.g., in response to a request for deletion). A "branch delete" may be implemented similarly by determining all the images on a particular branch 610, and setting all their respective image states from to "delete." Notably, according to these embodiments, the index location is not immediately available for use by subsequent snapshot operations, as the image state is not set to "free." The index location may be freed for use by an additional cleanup, or "compaction," routine, as described below. In other embodiments, other techniques may be used to make the index locations available for use upon or following deletion.

Turning to restore operations, traditional techniques are available for reverting to an earlier version of the file system (e.g., any previous snapshot image 326 of the active file system 324). Typically, once a previous snapshot image 326 is restored to become an active file system 324, the host can discard all versions of the file system after the chosen version (e.g., by setting their respective image states to "delete" or "obsolete"). Where the restore operation is within a single branch (i.e., the selected snapshot image 326 is in the same branch as the active file system 324 on which the operation is being performed), the traditional techniques may be used. Further, as discussed above, the operation may automatically cause the retire file to be restored to its state as of the selected snapshot image 326. Inter-branch (or cross-branch) restore operations can be implemented in various ways.

According to one technique, any branches that stem from intermediate inflection points are deleted (e.g., using the branch delete operation described above). In this way, the relevant portion of the tree is effectively whittled down to become a single branch, and the restore operation becomes an intra-branch restore. For example, referring to FIG. 5B, suppose a user requests to restore W5 to R2. The technique would delete W4, so that R3 is no longer an inflection point, and the restore can proceed without branch interference.

According to another technique, branches of the tree are preserved through modified snapshot operations. Typically, embodiments of the snapshot operations are configured to be performed only on active file systems 324. However, alternative embodiments allow a modified snapshot (e.g., a "branch generate" routine) to add a branch with a new active file system 324 off of an existing read-only snapshot image 326. For example, referring again to FIG. 5B, suppose a user requests to restore W5 to R2. The restore operation would generate a new active file system (e.g., W6) with the root block pointer, retire file, etc. of R2; delete the branch containing W5 (which only has W5 in the illustrated tree), and keep R3 and W4 (though R3 would no longer be an inflection point).

Turning to compaction operations, it is desirable to clean up the file system and free up unused blocks. For example, delete or restore operations can render one or more versions (e.g., snapshot images 326 or active file systems 324) "obsolete" or "deleted." As discussed above, according to some embodiments, those image state designations are not enough to allow blocks referenced by those deleted or obsolete images to be reused by a subsequent version. Indeed, those blocks may still be used by one or more other "in use" or "active" versions of the file system.

Some techniques for compaction of the file system are described in U.S. Pat. No. 6,959,313, which has been incorporated herein. These techniques effectively perform operations (e.g., compute space map block entries 312) on a linear range of snapshots over the entire file system. Accordingly, similar techniques can still be used in the context of multiple active file systems 324. However, as discussed above, handling of multiple active file systems 324 can involve deferring updates to the "e" value in space map blocks 312. As such, full compaction in an environment that supports writable snapshots can further involve processing of the retire file to handle deferred "e" updates.

Figure 11:
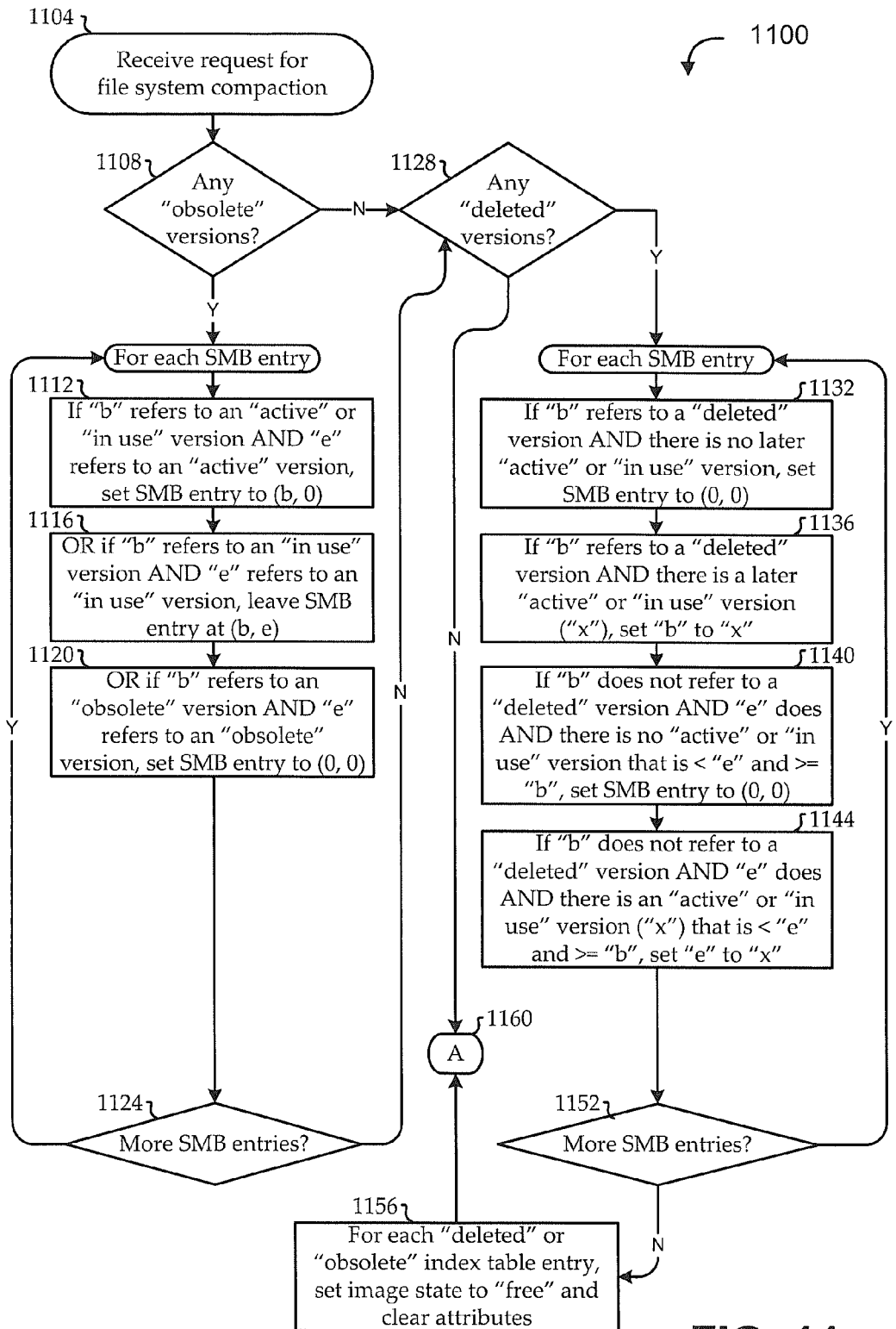
FIG. 11 shows a flow diagram of an illustrative compaction method, according to various embodiments.

For the sake of context, FIG. 11 shows a flow diagram of an illustrative compaction method 1100, according to various embodiments. The method 1100 begins at stage 1104 by receiving a request for compaction of the file system. In some embodiments, the compaction routine cleans up obsolete versions then deleted versions. In alternative embodiments, separate obsolete cleanup and deleted cleanup routines are provided. In still other embodiments, obsolete and deleted versions of the file system are cleaned up serially as they are found in the SMB entries (e.g., or as they are encountered in the index table, etc.). Some embodiments are implemented so as to read each SMB from disk only once. For example, the method 1100 can implement the "For each SMB entry" block by reading a particular SMB and performing the method steps for each SMB entry in the SMB before moving to the next SMB.

At stage 1108, a determination is made as to whether obsolete versions exist. If so, cleanup of the obsolete version occurs by proceeding through the SMB entries 312 associated with its blocks. For each SMB entry 312, there are effectively three possible conditions. According to a first condition, if "b" refers to an "active" or "in use" version, and "e" refers to an "active" version, the SMB entry 312 is set to "(b, 0)" at stage 1112. According to a second condition, if "b" refers to an "in use" version, and "e" refers to the same or another "in use" version, the SMB entry 312 is left at its current "(b, e)" at stage 1116. According to a third condition, if "b" refers to an "obsolete" version (in which case "e" should also refer to an obsolete version), the SMB entry 312 is set to "(0, 0)" at stage 1120. This indicates that the block is now free to use by another (i.e., "active," "in use," or subsequent) version. At stage 1124, a determination is made as to whether additional SMB entries 312 remain for the obsolete version. If so, the method 1100 iterates through stages 1112-1124 until no more SMB entries remain 312.

Returning to stage 1108, if a version is not obsolete (or if no more SMB entries are found at stage 1124), a determination is made at stage 1128 as to whether any versions are deleted. If so, cleanup of the deleted version occurs by proceeding through the SMB entries 312 associated with its blocks. For each SMB entry 312, there are effectively five possible conditions. According to a first condition, if "b" refers to a "deleted" version, and there is no later "active" or "in use" version, the SMB entry 312 is set to "(0, 0)" at stage 1132. According to a second condition, if "b" refers to a "deleted" version, and there is a later "active" or "in use" version ("x"), "b" is set to "x" at stage 1136. According to a third condition, if "b" does not refer to a "deleted" version, "e" does refer to a deleted version, and there is no "active" or "in use" version that is "b" or later and earlier than "e", the SMB entry 312 is set to "(0, 0)" at stage 1140. According to a fourth condition, if "b" does not refer to a "deleted" version, "e" does refer to a deleted version, and there is an "active" or "in use" version ("x") that is "b" or later and earlier than "e", "e" is set to "x" at stage 1144. If none of the above four conditions are present, it can be assumed (i.e., as a fifth condition) that neither "b" nor "e" refers to a "deleted" version, and the SMB entry 312 can be left as is. At stage 1152, a determination is made as to whether additional SMB entries 312 remain for the deleted version. If so, the method 1100 iterates through stages 1132-1152 until no more SMB entries 312 remain.

When no more SMB entries 312 remain to be cleaned for an obsolete version at stage 1124 or for a deleted version at stage 1152, the index table 310 entries can be cleaned (e.g., or, the entries can be cleaned as they are encountered). At stage 1156, for each obsolete or deleted index table 310 entry, the image state is set to "free." In some embodiments, the attributes are also cleared. For example, the timestamp is set to zero, the root block pointer is set to zero, and the image name is cleared. As illustrated by reference "A" 1160, embodiments then proceed to process the retire file, if needed.

Figure 12:
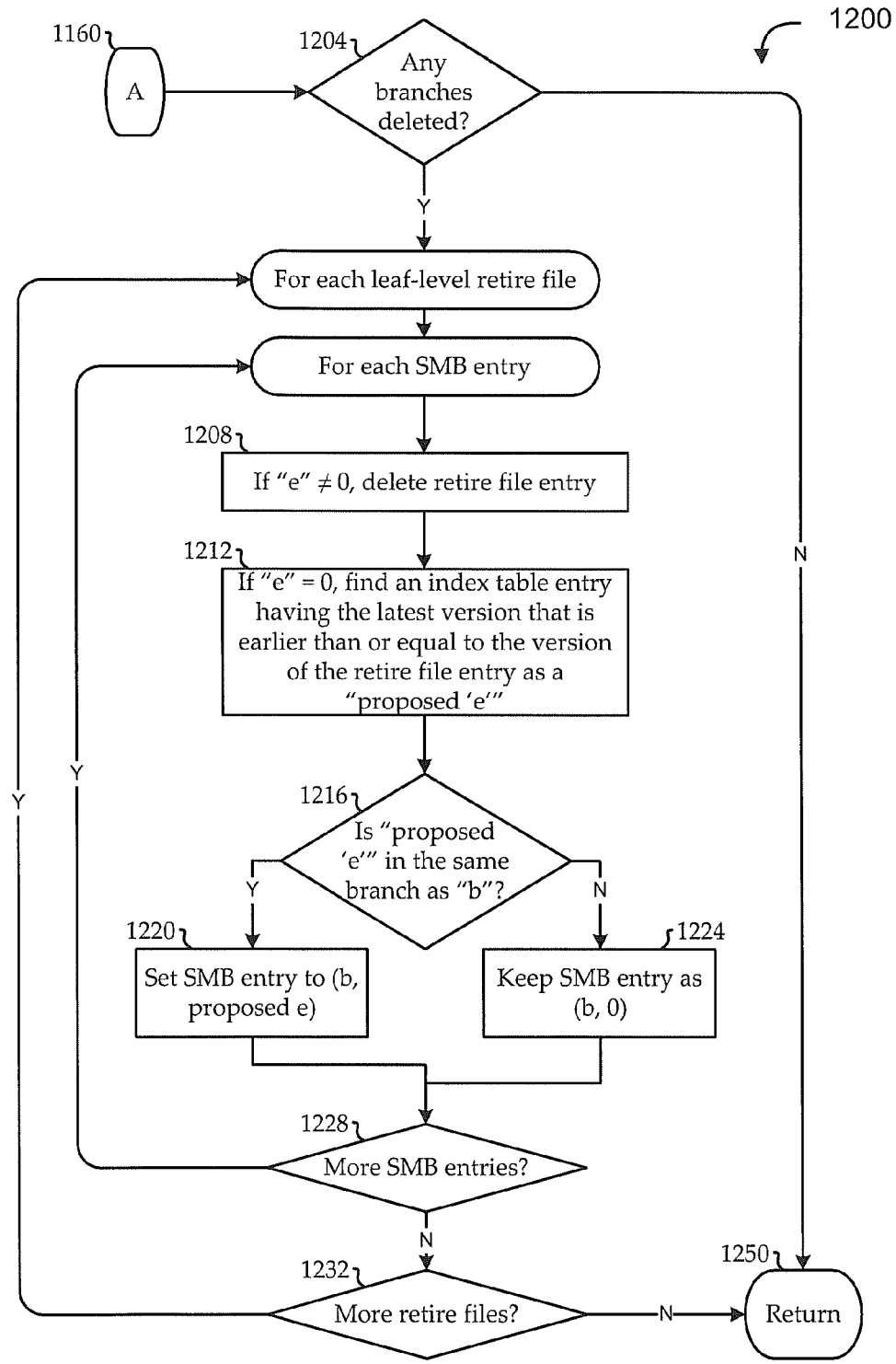
FIG. 12 shows a flow diagram of an illustrative method for processing retire file entries, according to various embodiments.

FIG. 12 shows a flow diagram of an illustrative method 1200 for processing retire file entries, according to various embodiments. For context, the method 1200 is shown beginning at reference 1160. A threshold determination may be made at stage 1204 as to whether any branch deletions occurred. It may be desirable only to perform retire file processing after an entire branch has been deleted, as that would effectively remove an inflection point (i.e., change an inflection point into a non-inflection point). The branch deletion may result from a branch delete operation or after a number of versions that happen to constitute an entire branch are deletes or made obsolete. If no branch deletion has occurred, the method 1200 may return to normal system operation at stage 1250.

If any branches have been deleted, the method 1200 may iterate through all leaf-level retire files (i.e., the retire file for each active file system 324). Within each retire file, the method 1200 may iterate through all its SMB entries 312, evaluating the "e" of each SMB entry. At stage 1208, if the "e" of the SMB entry 312 is not equal to "0", the retire file entry can be deleted. This may indicate that the entry was previously updated and its associated block can now be freed for use by another version. At stage 1212, if the "e" of the SMB entry 312 is equal to "0", an index table 310 entry is located as a "proposed 'e'" that has the latest version prior to or equal to the version of the retire file entry.

At stage 1216, a determination is made as to whether the proposed "e" version is in the same branch as the "b" of the SMB entry 312. If so, this indicates that there is no intervening inflection point between "b" and "e", and "e" can now be updated. Accordingly, the "e" value can be set to the proposed "e" value at stage 1220. If the proposed "e" version is not in the same branch as the "b" version, there is still an intermediate inflection point, and the "e" value cannot reliably be updated (e.g., it is assumed that there may be more than one possible "e"). Accordingly, at stage 1224, the SMB entry 312 is kept at its current "(b, 0)."

At stage 1228, a determination is made as to whether any SMB entries 312 remain to be evaluated in the retire file. If so, the method 1200 iterates through stages 1208-1224 for the remaining entries. If not, a further determination is made at stage 1232 as to whether any leaf-level retire files remain to be evaluated. If so, the method 1200 iterates through stages 1208-1228 for the remaining retire files. If not, the method 1200 may return to normal system operation at stage 1250.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for handling writable snapshots of an active file system, the method comprising:

deleting a branch of a file system represented as a tree structure comprising a plurality of nodes each corresponding to a version of the file system, each branch beginning at an inflection point of the tree structure at which a first version of the file system was converted from an active version of the file system to a read-only version of the file system in such a way that generated second and third active versions of the file system;

identifying remaining leaf nodes representing active versions of the file system, each having an associated retire file that comprises retire file entries, each retire file entry including a version identifier, a value for an earliest version value of the file system that points to a corresponding block, and a value for a latest version of the file system that points to the corresponding block, each corresponding block being of a type for which updating its latest version was deferred after a modification was made to the corresponding block; and for each retire file entry of each retire file associated with the remaining leaf nodes of the file system:

deleting the retire file entry if the latest version value associated with the retire file entry indicates a read-only version of the file system;

identifying a purported latest version of the file system that is earlier than that indicated by the version identifier of the retire file entry; and setting the latest version value associated with the retire file entry to the purported latest version only when the purported latest version is on the same branch of the file system as the earliest version value associated with the retire file entry.

2. The method of claim 1, wherein:

the first version of the file system comprises a set of pointers to blocks of a storage system including a root block;

converting the first version of the file system comprises:

locating a first index table entry corresponding to the first version of the file system, first index table entry indicating a root block pointer to the root block and indicating a writable state; and modifying the first index table entry to indicate a read-only state; and generating the second and third versions of the file system comprises:

locating second and third index table entries, both being available for assignment to a new version of the file system;

modifying each of the second and third index table entries to indicate a writable state; and modifying each of the second and third index table entries to indicate a root block pointer to the root block of the first version of the file system.

3. The method of claim 2, wherein each block of the storage system is associated with a space map block entry (b, e), wherein "b" represents the value of the earliest version of the file system that points to the block, and "e" represents the value of the latest version of the file system that points to the block.

4. The method of claim 3, wherein "b" indicates an index table entry corresponding to the earliest version of the file system that points to the block.

5. The method of claim 3, wherein e indicates an index table entry corresponding to the latest version of the file system that points to the block when the latest version is a read-only snapshot of the file system, and "e" is "0" otherwise.

6. The method of claim 3, wherein, in response to a request to modify a designated block being pointed to by at least the second version of the file system:

determining a fourth version of the file system that is the latest version of the file system that points to the designated block and is earlier than the second version of the file system;

determining whether any inflection points are present between the fourth version of the file system and the version of the file system indicated by "b" of the space map block associated with the designated block; and setting "e" of the space map block associated with the designated block to indicate the fourth version of the file system only when there is no inflection point between the fourth version of the file system and the version of the file system indicated by "b" of the space map block associated with the designated block.

7. The method of claim 6, further comprising:

writing an entry to a retire file associated with the second version of the file system when there is at least one inflection point between the fourth version of the file system and the version of the file system indicated by "b" of the space map block associated with the designated block, the entry indicating the designated block and the second version.

8. The method of claim 3, wherein:

deleting the retire file entry if the latest version value associated with the retire file entry indicates a read-only version of the file system comprises deleting the retire file entry if the "e" value of the space block map entry associated with the retire file entry indicates a version of the file system corresponding to a read-only snapshot;

identifying the purported latest version of the file system that is earlier than that indicated by the version identifier of the retire file entry comprises identifying an index table entry "x" corresponding to a latest version of the file system that is earlier than the version of the version identifier of the retire file entry; and setting the latest version value associated with the retire file entry to the purported latest version only when the purported latest version is on the same branch of the file system as the earliest version value associated with the retire file entry comprises setting the "e" value of the space block map entry associated with the retire file entry to "x" only when "x" is on the same branch of the file system as the version indicated by the "b" value of the space block map entry associated with the retire file entry.

9. The method of claim 1, further comprising:

deferring updates to the first version of the file system until after the generating step is complete.

10. The method of claim 9, further comprising:

updating at least one of the second version or the third version of the file system according to the deferred updates.

11. A data storage system comprising:

at least one processor;

storage comprising a plurality of blocks for storing data of a plurality of hierarchically related versions of a file system and a space map block (SMB) entry (b, e) corresponding to each block, wherein "b" represents an earliest version of the file system that points to the block, and "e" represents a latest version of the file system that points to the block;

and a non-transitory, computer-readable memory having stored thereon a tree structure comprising a plurality of nodes each corresponding to one of the versions of the file system arranged in branches each beginning at an inflection point of the tree structure at which a first version of the file system was converted from an active version of the file system to a read-only version of the file system in such a way that generated second and third active versions of the file system, and the memory having stored thereon instructions which, when executed, cause the at least one processor to perform steps comprising:

deleting one of the branches of the file system;

identifying remaining leaf nodes representing active versions of the file system, each having an associated retire file that comprises retire file entries, each retire file entry including a block identifier and a version identifier associated with a block for which updating of the "e" value of its space block map entry was deferred after a modification was made to the block; and for each retire file entry of each retire file associated with the remaining leaf nodes of the file system:

deleting the retire file entry if the "e" value of the space block map entry associated with the retire file entry indicates a version of the file system corresponding to a read-only version;

identifying a purported latest version of the file system that is earlier than the second version; and setting the "e" value of the space block map entry associated with the retire file entry to the purported latest version only when the purported latest version is determined to be on the same branch of the file system as the version indicated by the "b" value of the space block map entry associated with the retire file entry.

12. The data storage system of claim 11, further comprising:

an index table comprising an index table entry corresponding to each version of the file system, each index table entry indicating a root block pointer and an image state of its corresponding version of the file system.

13. The data storage system of claim 11, wherein the memory, when executed, causes the at least one processor to perform steps further comprising, in response to a request to take a writable snapshot of the second version of the file system:

converting the second version of the file system to a read-only version of the file system; and generating fourth and fifth versions of the file system, each being an independently writable version of the file system and a child of the second version of the file system.

14. The data storage system of claim 13, the processor-readable instructions, when executed, causing the processor to perform steps further comprising:

deferring updates to the second version of the file system until after the generating step is complete.

15. The data storage system of claim 13, further comprising:

an index table comprising an index table entry corresponding to each version of the file system, each index table entry comprising a root block pointer that points to a root block of its version and an image state of indicating whether its version is read-only or writable, wherein:

converting the second version of the file system comprises locating a first index table entry corresponding to the second version and modifying the image state to indicate that the second version is read-only; and generating the fourth and fifth versions of the file system comprises locating second and third available index table entries to correspond to the fourth and fifth versions, respectively, modifying each of the second and third index table entries so that their image states indicate that their corresponding versions are writable and so that their root block pointers point to the root block of the second version.

16. The data storage system of claim 11, wherein the memory, when executed, causes the at least one processor to perform steps further comprising, in response to a request to modify a designated block being pointed to by at least the second version of the file system:

determining a fourth version of the file system that is the latest version of the file system that points to the designated block and is earlier than the second version of the file system;

determining whether any inflection points are present between the fourth version of the file system and the version of the file system indicated by "b" of the space map block associated with the designated block; and setting "e" of the space map block associated with the designated block to indicate the fourth version of the file system only when there is no inflection point between the fourth version of the file system and the version of the file system indicated by "b" of the space map block associated with the designated block.

17. The data storage system of claim 16, the processor-readable instructions, when executed, causing the processor to perform steps further comprising:

writing an entry to a retire file associated with the second version of the file system when there is at least one or more inflection point between the fourth version of the file system and the version of the file system indicated by "b" of the space map block associated with the designated block, the entry indicating the designated block and the second version.

\* \* \* \* \*

UNITED STATES PATENT AND TRADEMARK OFFICE
CERTIFICATE OF CORRECTION

PATENT NO. : 8,600,939 B2  
APPLICATION NO. : 13/280141  
DATED : December 3, 2013  
INVENTOR(S) : Shoens Page 1 of 1

It is certified that error appears in the above-identified patent and that said Letters Patent is hereby corrected as shown below:

In the Specification

In column 10, line 62, delete "and or" and insert -- and/or --, therefor.

In column 13, line 11, delete ""(a,j)."" and insert -- "(a,0)." --, therefor.

In column 13, line 43, delete ""(x,j),"" and insert -- "(x,0)," --, therefor.

Signed and Sealed this  
Third Day of June, 2014

Michelle K. Lee  
*Deputy Director of the United States Patent and Trademark Office*